(12) United States Patent
Ho

(10) Patent No.: US 7,492,736 B2
(45) Date of Patent: Feb. 17, 2009

(54) SYSTEM AND METHOD FOR ACCESS AND MANAGEMENT OF BEACON PERIODS IN DISTRIBUTED WIRELESS NETWORKS

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 185 days.

(21) Appl. No.: 11/263,617

(22) Filed: Oct. 31, 2005

(65) Prior Publication Data

US 2006/0092909 A1 May 4, 2006

Related U.S. Application Data

(60) Provisional application No. 60/623,602, filed on Oct. 29, 2004.

(51) Int. Cl.
*H04Q 7/00* (2006.01)
(52) U.S. Cl. .................. 370/329; 370/474; 370/336; 370/338; 370/321; 370/230; 370/445; 370/448; 455/450; 455/452.1; 455/502; 455/41.2
(58) Field of Classification Search ............... 370/329, 370/338, 347, 350, 348, 337, 321, 468, 503; 455/452.1
See application file for complete search history.

(56) References Cited

U.S. PATENT DOCUMENTS

| | | | | |
|---|---|---|---|---|
| 5,838,667 A | * | 11/1998 | Bingham et al. | 370/294 |
| 6,031,827 A | * | 2/2000 | Rikkinen et al. | 370/330 |
| 6,052,594 A | * | 4/2000 | Chuang et al. | 455/450 |
| 6,198,728 B1 | * | 3/2001 | Hulyalkar et al. | 370/310.1 |
| 6,356,759 B1 | * | 3/2002 | Mustajarvi | 455/450 |
| 6,377,608 B1 | * | 4/2002 | Zyren | 375/132 |
| 6,401,162 B1 | * | 6/2002 | Nasserbakht | 711/5 |
| 6,480,475 B1 | * | 11/2002 | Modlin et al. | 370/294 |
| 6,496,490 B1 | * | 12/2002 | Andrews et al. | 370/329 |
| 6,754,484 B1 | * | 6/2004 | Hiltunen et al. | 455/412.1 |
| 6,847,823 B2 | * | 1/2005 | Lehikoinen et al. | 455/456.1 |
| 6,907,020 B2 | * | 6/2005 | Periyalwar et al. | 370/337 |

(Continued)

FOREIGN PATENT DOCUMENTS

WO 2006027636 A2 3/2006

OTHER PUBLICATIONS

Goratti, Leonardo et al.; Energy Consumption of Beacon Period Extension and Contraction in Distributed Medium Access Control, The 17th Annual IEEE International Symposium on Personal, Indoor and Mobile Radio Communications (PIMRC'06).

*Primary Examiner*—Marceau Milord
(74) *Attorney, Agent, or Firm*—Steven A. Shaw; W. James Brady; Frederick J. Telecky, Jr.

(57) ABSTRACT

The present application describes a system and method of managing beacon periods in a distributed wireless network. According to an embodiment, devices move their beacons to earliest available beacon slots in the beacon period and contract their beacon periods to increase data periods for higher data throughput of the wireless network. According to another embodiment, devices detect and resolve their beacon collision to maintain the integrity of their beacons for effective exchange of medium access and control messages as needed in a distributed wireless network.

31 Claims, 3 Drawing Sheets

U.S. PATENT DOCUMENTS

| | | | |
|---|---|---|---|
| 6,912,261 B2 * | 6/2005 | Aslanis et al. | 375/364 |
| 6,925,068 B1 * | 8/2005 | Stanwood et al. | 370/329 |
| 6,980,541 B2 * | 12/2005 | Shvodian | 340/346 |
| 6,993,006 B2 * | 1/2006 | Pankaj | 370/342 |
| 7,003,283 B2 * | 2/2006 | Hiltunen et al. | 455/412.1 |
| 7,068,678 B2 * | 6/2006 | Cioffi et al. | 370/449 |
| 7,079,549 B2 * | 7/2006 | Cioffi et al. | 370/468 |
| 7,085,281 B2 * | 8/2006 | Thomas et al. | 370/442 |
| 7,110,370 B2 * | 9/2006 | Cioffi et al. | 370/280 |
| 7,110,380 B2 * | 9/2006 | Shvodian | 370/336 |
| 7,177,275 B2 * | 2/2007 | Stanwood et al. | 370/230 |
| 7,218,604 B2 * | 5/2007 | Hosur et al. | 370/203 |
| 7,230,931 B2 * | 6/2007 | Struhsaker | 370/280 |
| 7,254,399 B2 * | 8/2007 | Salokannel et al. | 455/452.2 |
| 7,280,517 B2 * | 10/2007 | Benveniste | 370/338 |
| 7,280,801 B2 * | 10/2007 | Dahl | 455/41.2 |
| 7,304,975 B2 * | 12/2007 | Shvodian | 370/338 |
| 7,315,534 B2 * | 1/2008 | Kim et al. | 370/342 |
| 7,352,728 B2 * | 4/2008 | Soomro | 370/338 |
| 7,382,757 B2 * | 6/2008 | LoGalbo et al. | 370/338 |
| 7,433,370 B1 * | 10/2008 | Tymes | 370/474 |
| 7,433,697 B2 * | 10/2008 | Karaoguz et al. | 455/458 |

* cited by examiner

SYSTEM AND METHOD FOR ACCESS AND MANAGEMENT OF BEACON PERIODS IN DISTRIBUTED WIRELESS NETWORKS

This is a provisional application which claims benefit of provisional application Ser. No. 60/623,602 filed Oct. 29, 2004.

BACKGROUND

1. Field of the Invention

The invention relates to data communications and networking and in particular, the access and management of beacon periods in superframes of distributed wireless networks.

2. Description of the Related Art

Generally, IEEE 802.11 based and other wireless networks require access points to coordinate and control medium access of devices in the network for wireless services. Services are interrupted or disabled in such networks when devices or access points move away from each other, when access points malfunction, or when access points do not coordinate among themselves, which is typically the case. Recently, a new generation of distributed wireless networks using high-speed, short-range ultra-wideband technology has been proposed by Multiband OFDM Alliance (MBOA) or WiMedia Alliance that does not require any existing infrastructure (such as access points) for communication. These networks can provide data throughput of up to about 500 Mbps. Protocols are defined for devices in a distributed wireless network to detect other devices within their neighborhood and establish communication with them without having to go through access points. The basic architecture of the wireless network is defined by various specifications issued by WiMedia, such as "Distributed Medium Access Control (MAC) for Wireless Networks", Draft 0.99, Oct. 14, 2005, which is incorporated herein by references in its entirety for all purposes.

Distributed wireless networks may be formed without a central coordinator like an access point to overcome those drawbacks. In such networks, devices transmit their beacons as means of coordinating their medium access. These beacons are transmitted periodically, or once every predetermined time interval called a superframe. The superframe is a periodic time interval for coordinating frame transmission between devices. The superframe includes a beacon period (BP) followed by a data period. The superframe may have a predetermined duration and is composed of several Medium Access Slots (MAS), each MAS having a duration. The superframe starts with a BP, which may include one or more MASs. The start of the first MAS in the BP is referred to as the beacon period start time (BPST). The BPST can be defined by a device operating in a wireless network.

Beacons are transmitted in BPs located at the beginning of each superframe. Because the number of devices actively communicating in the network and hence in need of transmitting a beacon varies, it is desirable to have BPs that expand or contract in response to corresponding increase or decrease in the number of active devices so that the remaining period in the superframe can be maximized for data communication, which results in maximization of channel utilization. However, issues arise when BPs are allowed to vary in length and some devices may transmit their beacons into the same time interval as other devices, thus garbling the beacons.

When a device is turned on, it scans one or more communication channels to search for beacons from other devices in its neighborhood and selects a channel for communication. If the device detects one or more beacons in the selected channel, then the device synchronizes its BPST to that defined by the existing beacons in the selected channel and joins the group of devices having the same BPST. This group of devices is referred to as the beacon group (BG). These are logical groups of devices formed around each device to facilitate contention free frame exchanges between devices. If the device does not detect one or more beacons in the selected channel, then the device creates its own BP and sends a beacon on the selected channel to inform other devices that may later communicate in the selected channel.

Each device operates in a dynamic environment and has capability to dynamically change the channel in which it operates without requiring either user intervention or causing the disruption of communications with its peers. Similarly, devices in each BG can modify their BPs to adapt to the dynamic environment around them. Therefore, there is a need for a system and method to effectively access and manage BPs in a distributed wireless network.

SUMMARY

The present application describes a system and method of managing BPs in a distributed wireless network. According to an embodiment, a device that occupies the highest numbered beacon slot in its BP monitors the BP to identify an earliest available beacon slot (other than signaling slots) and moves its beacon to that beacon slot. Similarly, a device that occupies the next highest numbered beacon slot follows the similar process to move its beacon to the earliest available beacon slot it finds. The process continues until all earliest available beacon slots are occupied. This process results in a compact BP and hence improved data throughput in the distributed wireless network.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

DESCRIPTION OF THE PREFERRED EMBODIMENT(S)

The description that follows presents a series of systems, apparatus, methods, and techniques that facilitate additional local register storage through the use of a virtual register set in a processor. While much of the description herein assumes a single processor, process or thread context, some realizations in accordance with the present invention provide expanded internal register capability customizable for each processor of a multiprocessor, each process and/or each thread of execution. Accordingly, in view of the above, and without limitation, certain exemplary exploitations are now described.

Figure 1:
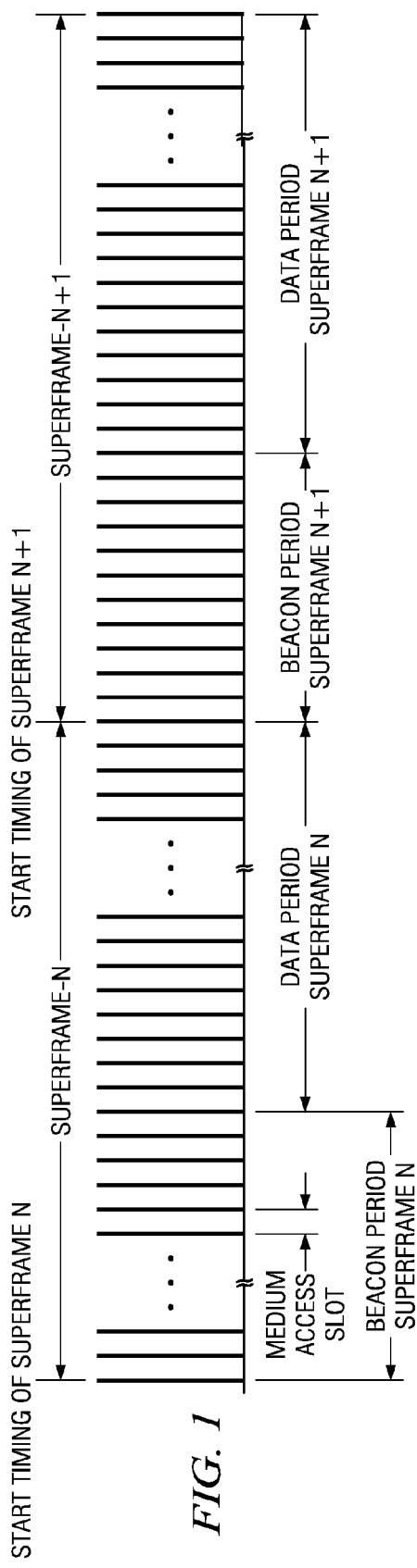
FIG. 1 illustrates exemplary structures of superframes according to an embodiment.

FIG. 1 illustrates exemplary structures of superframes (e.g., superframe N and Superframe N+1) according to an embodiment. Each superframe includes several medium access slots (MASs). Each MAS occupies a certain amount of time. According to an embodiment, each MAS is 256 microseconds long, and each superframe includes 256 MASs. The BP seen by a device can include variable number of MASs. The BP of each superframe starts at the same time as the superframe and has a predetermined maximum length of mMaxBPLength beacon slots. A beacon slot typically occupies around one third of a MAS. Beacon slots in the BP are numbered in sequence. In one embodiment, the sequence numbers start at 0, however, sequence numbers can start from any desired number. Devices expecting to transmit or receive non-beacon frames transmit a beacon and receive beacons from all neighbor devices in the BP of each superframe. There may be certain exceptions as described below.

When a device transmits in a beacon slot, it commences the transmission at the beginning of that beacon slot. All beacons are transmitted at the base data rate of the network and into the same channel as other frames. The frame payload of beacons includes a predetermined maximum number of octets. This allows for at least a predetermined guard time and a short interframe space (SIFS) between the end of a beacon with a maximum-length frame payload and the start of the next beacon slot. Before a device transmits any frames, it scans for beacons in the selected channel. If the device does not receive beacons with a valid header check sequence (HCS) but not necessarily a valid frame check sequence (FCS) after the scan, then before transmitting or receiving any frames, the device creates a BP by sending a beacon in the first beacon slot after the signaling slots of the BP.

Figure 2:
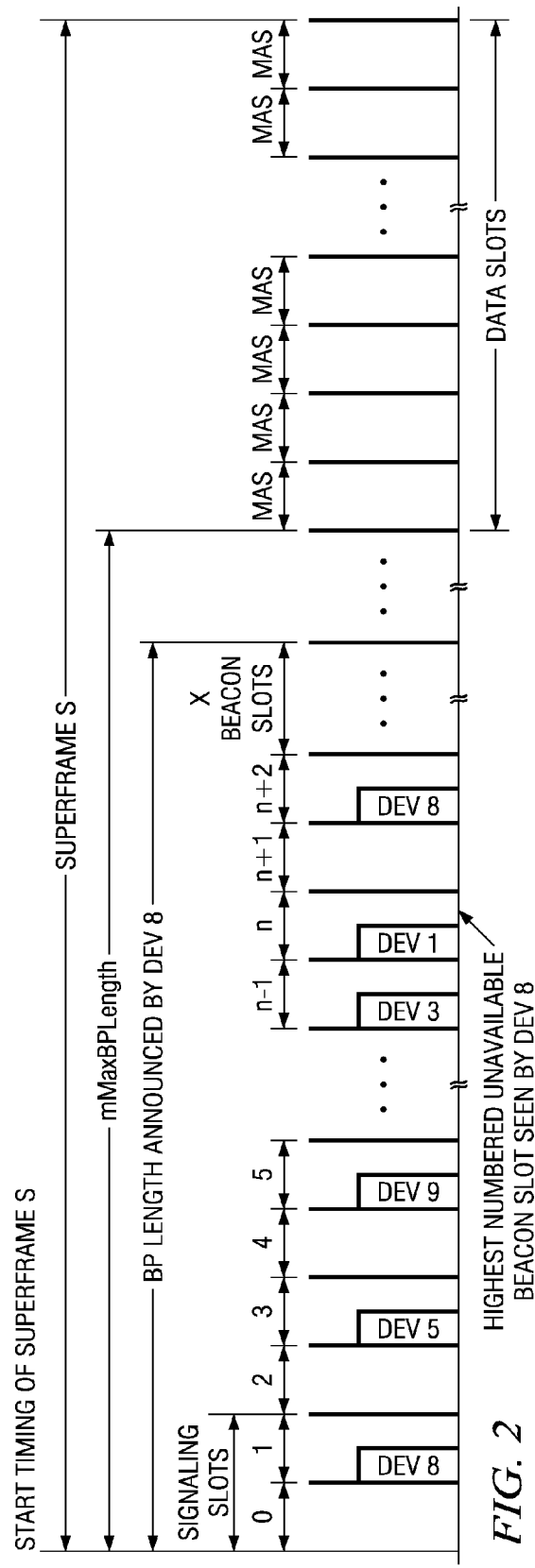
FIG. 2 illustrates the beacon period observed by a device at a given superframe S.

FIG. 2 illustrates an exemplary BP observed by a device, labeled as DEV 8, at a given superframe S according to an embodiment. If DEV 8 receives one or more beacons with a valid HCS during its scan, then the device does not create a new BP. Instead, prior to communicating with another device, the device transmits a beacon in a beacon slot chosen from up to mBPExtension beacon slots after the highest-numbered unavailable beacon slot it observes in the last superframe and within mMaxBPLength beacon slots after the BPST. In the present example, superframe S as observed by DEV 8 includes a BP with a maximum length of mMaxBPLength beacon slots. The BP includes beacon slots 0 and 1 as signaling slots, which are used to extend the BP length of neighbor devices. The remaining beacon slots within the BP are available for the transmission of devices' regular beacons. For purpose of illustration, slots 0 and 1 are shown as signaling slots; however, one skilled in the art will appreciate that any number of slots can be dedicated as signaling slots.

DEV 8 observes that slots 3, 5, n−1, and n are not available as they are occupied by various neighbor devices or neighbors' neighbors. The highest-numbered unavailable beacon slot in the BP is slot 'n' occupied by a neighbor device DEV 1. DEV 8 announces its BP length, measured in beacon slots, in its beacon. The announced BP length includes the device's own beacon slot and all unavailable beacon slots in the BP of the prior superframe. The announced BP length preferably does not include more than mBPExtension beacon slots after the last unavailable beacon slot in the BP of the prior superframe, unless BP merging is occurring. The mBPExtension parameter can be application specific. The announced BP length preferably does not exceed mMaxBPLength beacon slots. In the present example, DEV 8 uses slot n+2 for its beacon transmission and includes additional X beacon slots in its announced BP length.

According to an embodiment, DEV 8 does not transmit non-beacon frames during the largest BP length of its neighbors. DEV 8 listens for beacons in all beacon slots specified by its last announced BP length, except beacon slots in which it transmits its own beacon. The BP length reported by DEV 8 varies, as new devices come into its extended neighborhood and transmit their beacons in the same BP, and as DEV 8 or other devices in its extended neighborhood choose a new beacon slot for beacon collision resolution or BP contraction. The extended neighborhood of DEV 8 includes devices that DEV 8 itself cannot directly communicate with (e.g., because of range or the like factors); however, one of the neighbors of DEV 8 can directly communicate with them because the neighbor may be closer to those devices.

Because of the distributed nature of the network, some devices may select the same beacon slot to transmit their beacons. If these devices were sufficiently close to each other, or to another device, beacon collision would result. For example, DEV 5 is a neighbor of DEV 8 and DEV 3 is a neighbor of DEV 5. DEV 8 and DEV 3 are not in range of each other directly, but are both in range of DEV 5. Thus, if DEV 3 and DEV 8 use the same beacon slot to transmit their beacons, DEV 5 may not be able to hear either one due to a beacon collision at its receiver. That is, DEV 3 and DEV 8 may cause a beacon collision to DEV 5. If a device, such as DEV 3 or DEV 8, detects a beacon collision, then it chooses a different beacon slot located after the highest-numbered unavailable beacon slot it sees in the last BP for its subsequent beacon transmissions. If the beacon slot chosen for its beacon transmission is located beyond the BP length of any of its neighbors, then the device sends a beacon in a randomly chosen signaling beacon slot in the BP.

The signaling beacon slots are used when a device is sending a beacon for the first time in an existing BP or changing the beacon slot after detecting a beacon collision. The device continues to send beacons in the signaling beacon slot of up to mMaxLostBeacons superframes, until its neighbor devices extend their BP lengths to include its beacon slot. In the present example, device DEV 8 sends its beacon in signaling slot 1. The BP is local to a given device and includes beacons sent by the extended neighbors of the given device (including the device itself). A device determines its BP length from reception of its neighbors' beacons. BP length values are not propagated and different devices may have different BP lengths.

A device communicating with other devices listens for beacons during the BP length it announced in the last superframe. If a device received a beacon correctly from a signaling beacon slot in the previous superframe, then it sets its BP length to include the regular beacon slot indicated in the beacon received in the signaling slot. If a device received a frame with incorrect FCS, or detected a medium activity that did not result in reception of a frame with a valid HCS, in a signaling slot in the previous superframe, then it listens for an additional mBPExtension beacon slots after its last announced BP length, but not more than mMaxBPLength beacon slots after the BPST. To detect beacon collisions with neighbors, a device skips beacon transmission at least every mMaxNeighborDetectionInterval, an interval predetermined to detect collision with a neighbor.

In the above example, a device considers itself involved in a beacon collision with another device if its beacon slot is reported as occupied in the Beacon Period Information Element (BPOIE) of any beacon it receives correctly in the current superframe, but the corresponding Device Address (DevAddr) for the beacon slot is neither its own nor broadcast DevAddr,. A device also considers itself involved in a beacon collision if its beacon slot has been reported as occupied, but the corresponding DevAddr has been the broadcast DevAddr, in the BPOIE of a beacon it received correctly in the same beacon slot in each of the latest mMaxLostBeacons superframes. A device also considers itself involved in a beacon collision if its beacon slot is reported as occupied in the BPOIE of any beacon it receives in the current superframe, but it skipped beacon transmission in the last superframe. A device also considers itself involved in a beacon collision if it receives in the beacon slot it skips for beacon transmission a beacon frame MAC header or a PHY indication of medium activity that does not result in correct reception of a MAC header.

When devices drop out of the network (e.g., powered down or for the like reasons), the beacon slots used by them become unoccupied. If those devices occupied earliest beacon slots in the BP, then those beacon slots remain unoccupied while other devices communicate using later beacon slots in the BP. This results in wasted bandwidth and reduces the data throughput. Thus, when earliest beacon slots become available, remaining devices attempt to move their beacons to these slots and release their current beacon slots, resulting in shorter beacon periods and longer data periods, hence improving the network throughput.

When a device detects no beacon collision and finds an earlier available beacon slot, if its beacon has been occupied the highest-numbered beacon slot among the beacon-movable devices of its extended neighborhood, then the device moves its beacon into the earliest available beacon slot, after the signaling beacon slots, in the BP of the next superframe, as further described below.

FIGS. 3A-3D illustrate exemplary beacon move in a superframe according to an embodiment. To move its beacon, a device first identifies an earliest available beacon slot. A device considers a beacon slot available if in the latest mMaxLostBeacons+1 superframes the beacon slot was never encoded as occupied in the BPOIE of beacons transmitted or received by the device. According to an embodiment, mMaxLostBeacons is set to three. A device encodes a beacon slot as occupied if in the same beacon slot of the last superframe, it received a beacon frame with valid HCS and FCS, or it received a PHY indication of medium activity that did not result in reception of a beacon frame with valid HCS and FCS. According to an embodiment, a device monitors mMaxLostBeacons+1 consecutive superframes to determine whether a beacon slot is available or not.

Figure 3A:
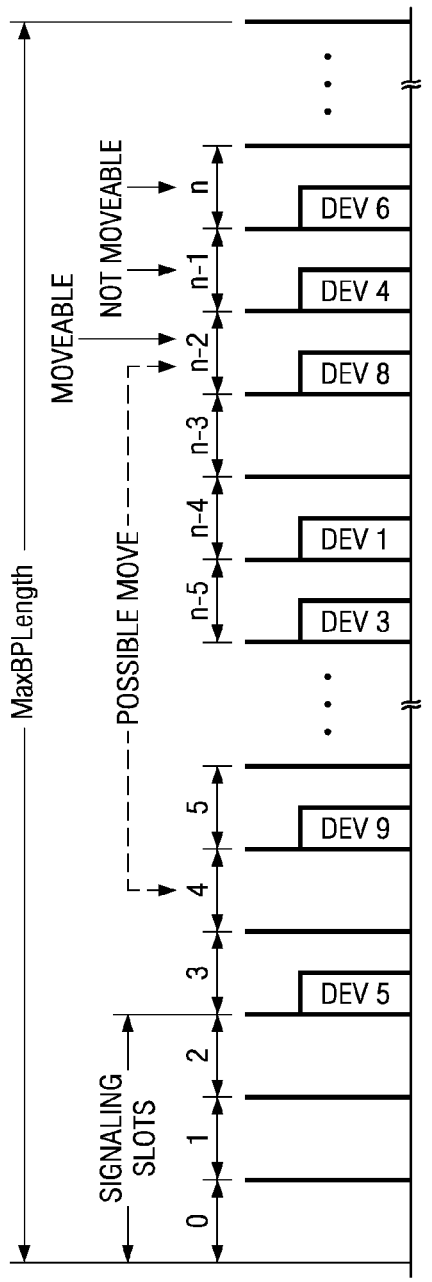
FIGS. 3A-3D illustrate exemplary beacon move in a superframe according to an embodiment.
Figure 3B:
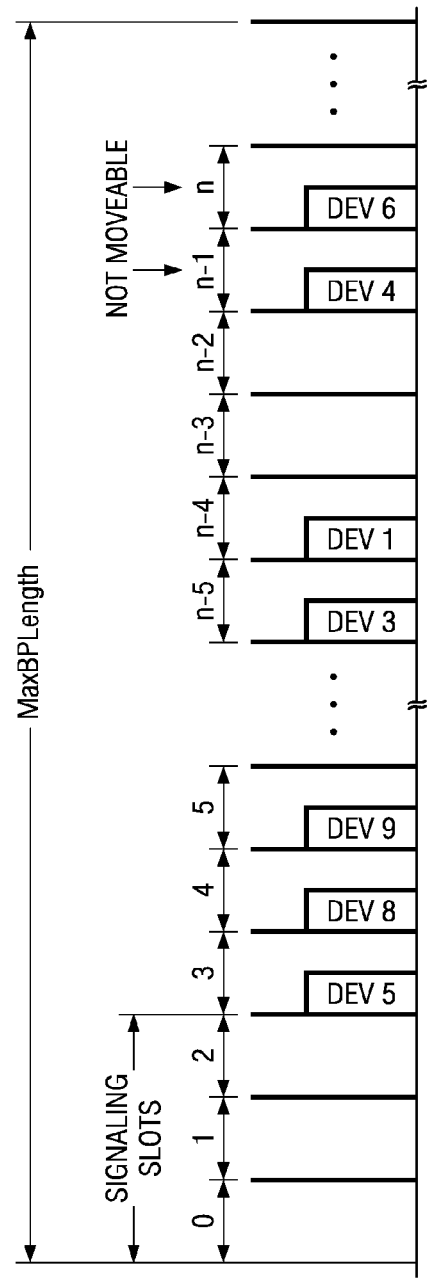

Referring to FIG. 3A, DEV 8 occupies beacon slot 'n−2' and is "moveable", meaning that it finds an earlier available beacon slot in the BP. DEV 4 and DEV 6 occupy beacon slots 'n−1' and 'n', respectively, and are not movable. Beacon slot 4 is available for DEV 8. Referring to FIG. 3B, DEV 8 follows the procedure to monitor beacon slot 4 for a predetermined number of superframes (e.g., three to four consecutive superframes) to determine whether beacon slot 4 is available. When DEV 8 confirms that beacon slot 4 is available for a possible move, it announces that its beacon is movable to all of its neighbor devices by setting a predetermined bit or using a predetermined encoding in its beacon. Neighbors of DEV 8 propagate this setting or encoding in the BPOIEs of their beacons sent in the next superframe after receiving a beacon from DEV 8 in the current superframe. When DEV 8 is not involved in a beacon collision, it moves its beacon into the earliest available beacon slot it sees, beacon slot 4 in this example, following the signaling slots in the BP of the next superframe, if in the latest mMaxLostBeacons+1 superframes, (a) its beacon has been movable and (b) all the beacon slots after the device's own and within the device's BP length have been encoded as non-movable in the BPOIE of the beacons transmitted or received by DEV 8. DEV 8 then releases beacon slot 'n−2', which becomes unoccupied by DEV 8.

Figure 3C:
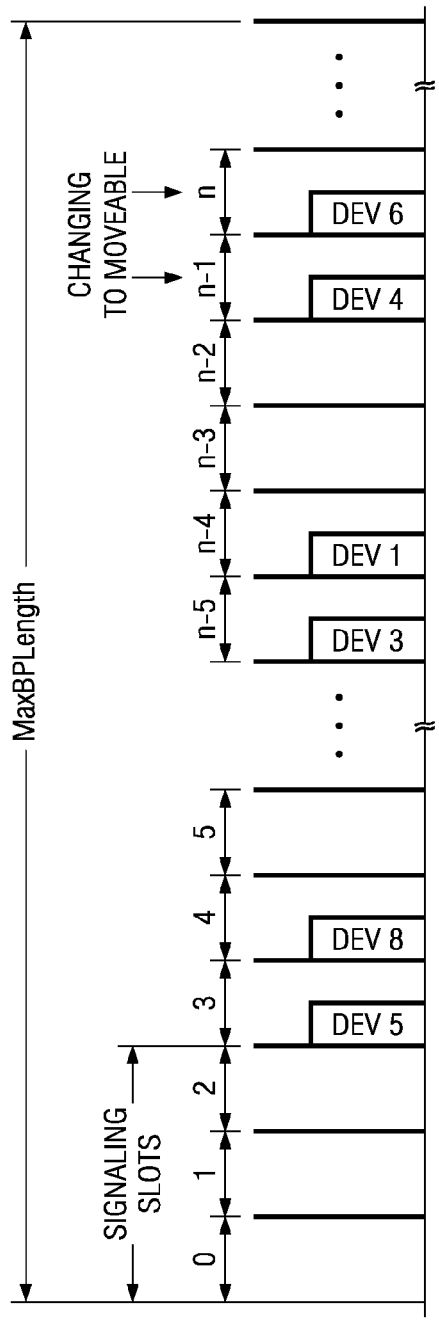
Figure 3D:
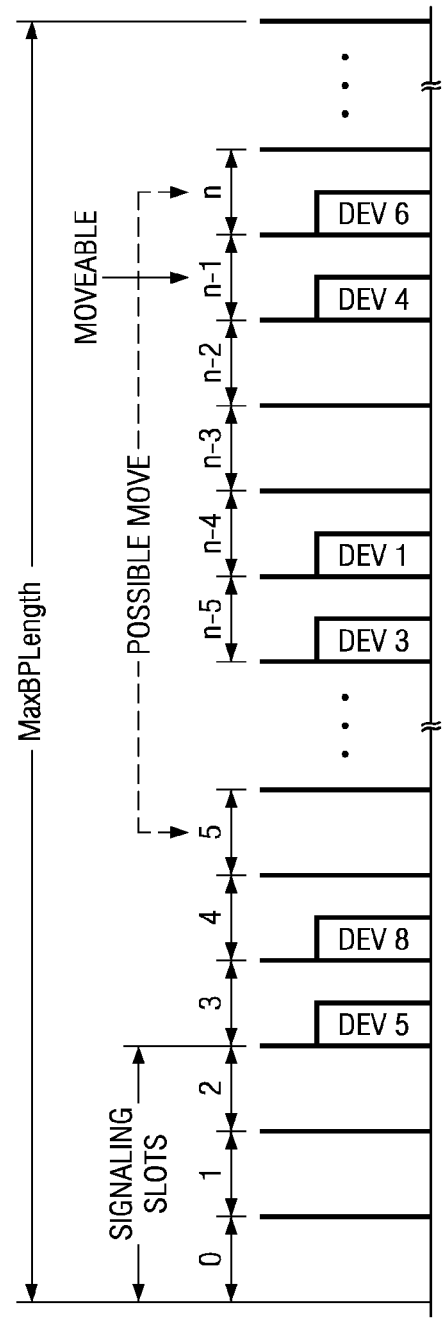

Referring to FIG. 3C, while DEV 8 was moving its beacon to beacon slot 4, DEV 9 which was occupying beacon slot 5 dropped off the neighborhood (e.g., powered off, roamed away, or the like). Upon noticing an available beacon slot 5, DEV 4 and DEV 6 begin to change their beacon status as moveable; however, because DEV 6 occupies the highest-numbered beacon slot, it has the priority to move its beacon before DEV 4. Referring to FIG. 3D, DEV 6 follows the same procedure as device DEV 8 and moves its beacon to beacon slot 5. Similarly, DEV 4 then becomes the device occupying the highest-numbered beacon slot and becomes the next moveable device and may move its beacon to the earliest available beacon slot (e.g., slot n−3 or the like). When a device observes that it cannot move to any earliest beacon slot (e.g., DEV 5), it declares itself as non-moveable by setting a predetermined bit in its beacon, which is propagated by its neighbors via the BPOIEs of their beacons sent in subsequent superframes.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of managing beacon periods in a distributed wireless network, wherein there is not a central controller, comprising:

selecting by a distributed device of the distributed wireless network without a central controller a first available beacon slot that is available in a superframe in the distributed wireless network; and transmitting a beacon in the selected available beacon slot, wherein the first beacon slot is available if the first beacon slot is not encoded as occupied in a beacon period occupancy information element (BPOIE) of beacons transmitted or received by the device in a predetermined number of latest superframes.

2. A method according to claim 1, wherein the first beacon slot is unavailable if the first beacon slot is encoded as occupied in a BPOIE of the beacon transmitted by a device in the current superframe and if in the first beacon slot of the last superframe, the device received a beacon frame with valid header check sequence (HCS) and frame check sequence (FCS).

3. A method according to claim 1, wherein the first beacon slot is encoded as occupied in a BPOIE of the beacon transmitted by a device in the current superframe if in the first beacon slot of the last superframe, the device received an indication of medium activity that did not result in reception of a beacon frame with valid HCS and FCS.

4. A method according to claim 2 or claim 3, wherein a device does not transmit non-beacon frames during the largest beacon period of its neighbor devices.

5. A method according to claim 1, wherein the predetermined number is three.

6. A method according to claim 1, wherein a superframe contains a beacon period (BP), the beacon period having a maximum length of mMaxBPLength beacon slots.

7. A method according to claim 6, wherein mMaxBPLength is 96.

8. A method according to claim 6, wherein the beacon period contains predetermined mSignalSlotCount signaling slots, the signaling slots being used to extend the BP length of neighbor devices.

9. A method according to claim 8, wherein mSignalSlotCount is 2.

10. A method according to claim 1, wherein the beacon transmitted by a device contains a beacon period length (BP length) field, the BP length field defining the length of the device's beacon period.

11. A method according to claim 10, wherein the BP length includes the device's own beacon slot and all unavailable beacon slots in the beacon period of the prior superframe.

12. A method according to claim 10, wherein the BP length does not include more than mBPExtension beacon slots after the last unavailable beacon slot in the beacon period of the prior superframe, unless beacon period merging is occurring.

13. A method according to claim 10, wherein the BP length does not exceed mMaxBPLength beacon slots.

14. A method according to claim 10, wherein a device listens for beacons during the BP length it announced in the last superframe.

15. A method of managing beacon periods in a distributed wireless network, wherein there is not a central controller, comprising:
   selecting by a distributed device of the distributed wireless network without a central controller a first available beacon slot that is available in a superframe in the distributed wireless network;
   transmitting a beacon in the selected available beacon slot;
   scanning for beacons in a selected communication channel for at least one superframe before transmitting any frames in that channel;
   if the device does not receive beacons with a valid HCS but not necessarily a valid FCS after the scan, then
      selecting the first beacon slot as a beacon slot immediately following the signaling slots; and
      creating a beacon period by transmitting a beacon in the said first beacon slot before transmitting or receiving any frames.

16. A method according to claim 15, further comprising:
   if the device receives beacons with a valid HCS during the scan, then selecting the first beacon slot as a beacon slot chosen from up to mBPExtension beacon slots after the highest-numbered unavailable beacon slot it observes in the last superframe and within mMaxBPLength beacon slots after the BPST, and creating no new beacon period by transmitting a beacon in the said first beacon slot prior to communicating with another device.

17. A method according to claim 16, wherein mBPExtension is 8.

18. A method of managing beacon periods in a distributed wireless network, wherein there is not a central controller, comprising:
   selecting by a distributed device of the distributed wireless network without a central controller a first available beacon slot that is available in a superframe in the distributed wireless network:
   if the device detects a beacon collision, selecting a second available beacon slot and transmitting a beacon in the second available beacon slot in subsequent superframes
   if the selected first beacon slot or second beacon slot is located beyond the BP length of any of its neighbor devices, then transmitting a beacon in a randomly chosen signaling beacon slot in the beacon period in the current superframe, and in up to mMaxLostBeacons subsequent superframes, until its neighbor devices extend their BP lengths to include the said first beacon slot or second beacon slot.

19. A method according to claim 18, further comprising:
   if the device received a beacon correctly from a signaling beacon slot in the previous superframe, then setting its BP length to include the regular beacon slot indicated in the beacon received in the signaling slot; and
   if the device received a frame with incorrect FCS, or detected a medium activity that did not result in reception of a frame with a valid HCS, in a signaling slot in the previous superframe, then listening for an additional mBPExtension beacon slots after its last announced BP length, but not more than mMaxBPLength beacon slots after the BPST.

20. A method according to claim 18, wherein the second available beacon slot is chosen from up to mBPExtension beacon slots after the highest-numbered unavailable beacon slot it observes in the last superframe and within mMaxBPLength beacon slots after the BPST.

21. A method according to claim 18, wherein a device detects a beacon collision if its beacon slot is reported as occupied in the BPOIE of any beacon it receives correctly in the current superframe, but the corresponding Device Address (DevAddr) for the beacon slot is neither its own nor broadcast DevAddr.

22. A method according to claim 18, wherein a device detects a beacon collision if its beacon slot has been reported as occupied, but the corresponding DevAddr has been the broadcast DevAddr, in the BPOIE of a beacon it received correctly in the same beacon slot in each of the latest mMaxLostBeacons superframes.

23. A method according to claim 18, wherein a device detects a beacon collision if its beacon slot is reported as occupied in the BPOIE of any beacon it receives in the current superframe, but it skipped beacon transmission in the last superframe.

24. A method according to claim 18, wherein a device detects a beacon collision if it receives in the beacon slot it skips for beacon transmission a beacon frame MAC header or a PHY indication of medium activity that does not result in correct reception of a MAC header.

25. A method according to claim 24, wherein a device skips beacon transmission at least every mMaxNeighborDetectionInterval.

26. A method according to claim 25, wherein mMaxNeighborDetectionInterval is 128 superframes.

27. A method of managing beacon periods in a distributed wireless network, wherein there is not a central controller, comprising:
   selecting by a distributed device of the distributed wireless network without a central controller a first available beacon slot that is available in a superframe in the distributed wireless network; and transmitting a beacon in the selected available beacon slot, further comprising:

if the device does not detect a beacon collision, selecting a third available beacon slot, the third available beacon slot being located after the signaling slots but before the current beacon slot in the beacon period; and transmitting a beacon in the said third available beacon slot rather than in the current beacon slot.

28. A method according to claim 27, wherein the said third available beacon slot is the earliest beacon slot after the signaling slots that is available to the device.

29. A method according to claim 27, wherein the said third available beacon slot is the latest beacon slot after the signaling slots but before the device's current beacon slot that is available to the device.

30. A method according to claim 27, wherein the device transmits a beacon in the said third available beacon slot rather than in the current beacon slot, if and only if in the latest mMaxLostBeacons+1 superframes, its beacon has been movable and all the beacon slots after the device's own and within the device's BP length have been encoded as non-movable in the BPOIE of the beacons transmitted or received by the device.

31. A method according to claim 30, further comprising:

if the devices finds the third available beacon slot, announcing in its beacon that its beacon is movable by setting a predetermined bit or using a predetermined encoding in its beacon; and propagating the said setting or encoding by the device's neighbors in the BPOIEs of their beacons transmitted in the next superframe.

* * * * *